US009145967B2

(12) United States Patent
Fox et al.

(10) Patent No.: US 9,145,967 B2
(45) Date of Patent: Sep. 29, 2015

(54) EPICYCLIC GEAR SYSTEM HAVING TWO ARRAYS OF PINIONS MOUNTED ON FLEXPINS WITH COMPENSATION FOR CARRIER DISTORTION

(71) Applicant: The Timken Company, Canton, OH (US)

(72) Inventors: Gerald P. Fox, Massillon, OH (US); Randy P. Kruse, North Canton, OH (US); Jaroslav Suchanek, Ujezd u Brna (CZ); Milos Malec, Velka Bites (CZ); James Maloof, Clinton, OH (US)

(73) Assignee: The Timken Company, North Canton, OH (US)

( * ) Notice: Subject to any disclaimer, the term of this patent is extended or adjusted under 35 U.S.C. 154(b) by 56 days.

(21) Appl. No.: 14/083,970

(22) Filed: Nov. 19, 2013

(65) Prior Publication Data

US 2014/0171255 A1    Jun. 19, 2014

Related U.S. Application Data

(63) Continuation of application No. 12/866,499, filed as application No. PCT/US2009/033896 on Feb. 12, 2009, now abandoned.

(60) Provisional application No. 61/028,274, filed on Feb. 13, 2008, provisional application No. 61/125,715, filed on Apr. 28, 2008.

(51) Int. Cl.
*F16H 1/28* (2006.01)
*F16H 57/08* (2006.01)

(52) U.S. Cl.
CPC ............ *F16H 57/082* (2013.01); *F16H 1/2836* (2013.01)

(58) Field of Classification Search
CPC ............................. F16H 57/082; F16H 1/2836
See application file for complete search history.

(56) References Cited

U.S. PATENT DOCUMENTS

| 3,527,121 A | 9/1970 | Moore |
| 3,776,067 A | 12/1973 | DeBruyne et al. |
| 3,943,787 A | 3/1976 | Hicks |

(Continued)

FOREIGN PATENT DOCUMENTS

| DE | 2235448 A1 | 2/1974 |
| DE | 3701729 A1 | 8/1988 |

(Continued)

*Primary Examiner* — Sherry Estremsky
*Assistant Examiner* — Lillian Nguyen
(74) *Attorney, Agent, or Firm* — Michael Best & Friedrich LLP

(57) ABSTRACT

An epicyclic gear system includes sun and ring gears (2, 4), planet pinions (6, 8) arrayed (a, b) between these gears, and a carrier (10) to which planet pinions are coupled through flexpins (30). The pinions are located between carrier walls (20, 22) with flexpins for the respective arrays cantilevered from opposite walls. The carrier is subjected to externally applied torque which transfers through the system. The load path ($p_a$) for one array is shorter than that ($p_b$) for the other array, which disparity causes carrier distortion with flexpins on one wall angularly displaced from flexpins on the other wall. The system compensates for this by one wall having areas (40, 44) of weakness where the flexpins cantilever from it. This enables the pinions of the two arrays to better mesh under a load and share torque transfer more evenly.

11 Claims, 7 Drawing Sheets

(56) References Cited

U.S. PATENT DOCUMENTS

| | | | |
|---|---|---|---|
| 4,155,275 A | 5/1979 | Devanney | |
| 6,994,651 B2 | 2/2006 | Fox et al. | |
| 7,056,259 B2 | 6/2006 | Fox | |
| 8,313,412 B2 | 11/2012 | Montestruc | |
| 2006/0142114 A1 | 6/2006 | Fox | |
| 2007/0275816 A1 | 11/2007 | Henderson | |
| 2008/0274849 A1 | 11/2008 | Smook et al. | |
| 2012/0289375 A1 | 11/2012 | Montestruc | |

FOREIGN PATENT DOCUMENTS

| | | |
|---|---|---|
| DE | 10334824 A1 | 5/2005 |
| EP | 1559928 A2 | 8/2005 |
| WO | 2007016336 A2 | 2/2007 |

EPICYCLIC GEAR SYSTEM HAVING TWO ARRAYS OF PINIONS MOUNTED ON FLEXPINS WITH COMPENSATION FOR CARRIER DISTORTION

CROSS REFERENCE TO RELATED APPLICATIONS

This continuation application derives priority from and otherwise claims the benefit of application U.S. Ser. No. 12/866,499, filed Nov. 8, 2010, which is a national stage application under 35 U.S.C. §371 of PCT application PCT/US2009/033896, filed Feb. 12, 2009, and published under International Publication No. WO2009/102853. That application is related to U.S. Provisional Patent Application No. 61/028,274, filed Feb. 13, 2008, and U.S. Provisional Application 61/125,715 filed Apr. 28, 2008, from both of which priority is claimed. The disclosures of all these applications are hereby incorporated by reference.

TECHNICAL FIELD

This invention relates in general to epicyclic gear systems, and more particularly to an epicyclic gear system having its planet pinions arranged in two arrays on flexpins with compensation for carrier distortion.

BACKGROUND ART

The typical epicyclic gear system has a sun gear, a ring gear surrounding the sun gear, and planet pinions located between and engaged with the sun and ring gears, and in addition, it has a straddle-type carrier that provides pins about which the planet pinions rotate, with the pins being anchored at both ends in the carrier. A gear system so configured has the capacity to transfer a large amount of power in a relatively compact configuration—or in other words, it has a high power density.

But heavy loads tend to distort the carrier and its pins and skew the axis about which the planet pinions rotate. Under such conditions, the planet pinions do not mesh properly with the sun and ring gears. This causes excessive wear in the planet pinions and the sun and ring gears, generates friction and heat, and renders the entire system overly noisy.

A planetary system in which the planet pinions are supported on and rotate about so-called flexpins mitigates the skewing. In this regard, a flexpin for a planet pinion at one end is anchored in and cantilevered from the wall of a carrier of which it is a part. The other end of the flexpin has a sleeve fitted to it, with the sleeve extending back over, yet otherwise spaced from the flexpin. The sleeve supports the planet pinion, in that it serves as a component of a bearing for the pinion. In other words, flexpin technology employs a double cantilever to offset the skewing that would otherwise occur. See U.S. Pat. Nos. 6,994,651 and 7,056,259, which are incorporated herein by reference, for a further discussion of flexpin technology.

The cantilevers produce high stresses in the flexpins, and to have more moderate stresses, some carriers have two walls with flexpins anchored in each of the walls and, of course, a separate planetary pinion around each flexpin. This doubles the number of flexpins to share the torque transferred through the system and thus reduces the unit load applied to each flexpin. The planet pinions are arranged in two arrays between the walls, there being for each pinion in the one array and corresponding pinion aligned with it in the other array. Spaces exist between pairs of corresponding pinions and webs extend between the two walls in these spaces. The carrier, whether it rotates or not, is subjected to an externally applied torque at one of its walls. The planet pinions transmit torque through the system, but the lengths of the load paths from the flexpins on the two walls differ, the load paths from the flexpins on the primary wall, which is subjected to the external torque, being considerably shorter than the load paths from the flexpins on the other or secondary wall. This renders the array, identified with the shorter load paths stiffer than the array identified with the longer load paths. The carrier undergoes a distortion that causes the flexpins on the secondary wall displace angularly with respect to the flexpins on the primary wall, reference being to the axis of the planetary system. Since the planet pinions of the two arrays mesh with the sun and ring gears, the displacement causes an uneven sharing of the torque transmitted at the teeth where the pinions mesh with the sun and ring gears.

DESCRIPTION OF THE INVENTION

Figure 6:
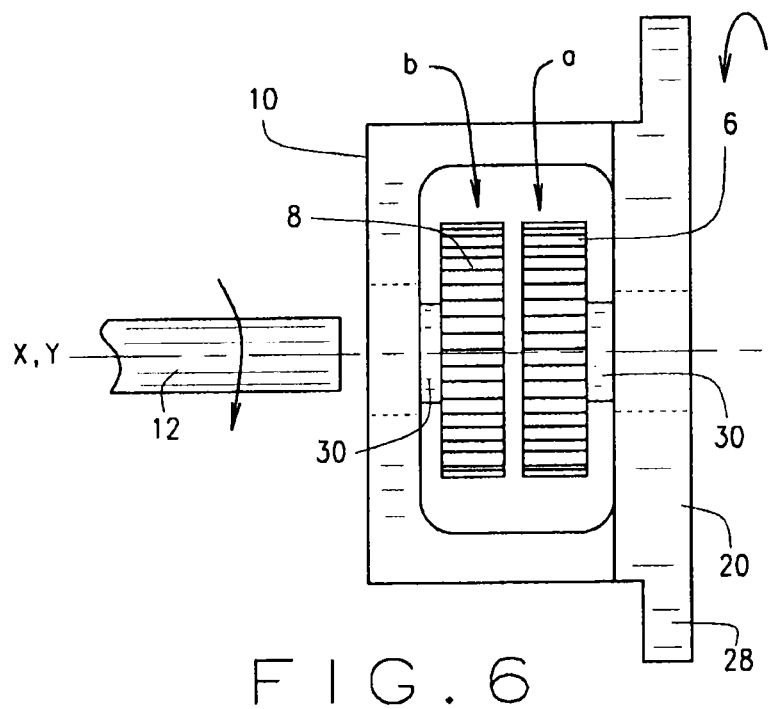
Figure 6A:
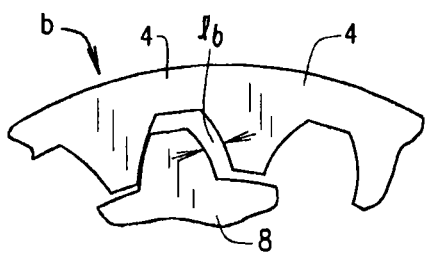
Figure 6B:
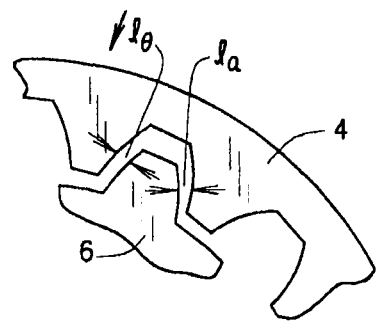
Figure 7:
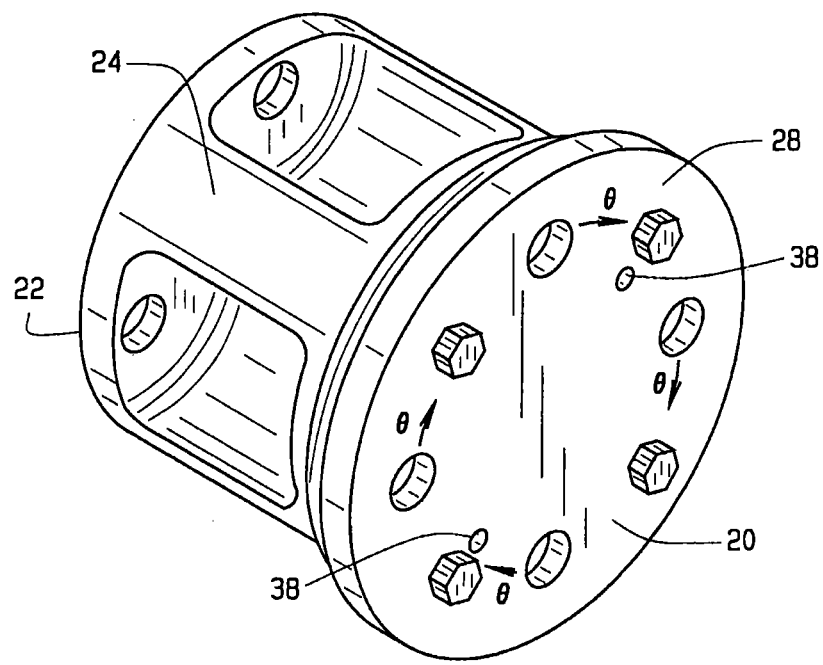
Figure 13:
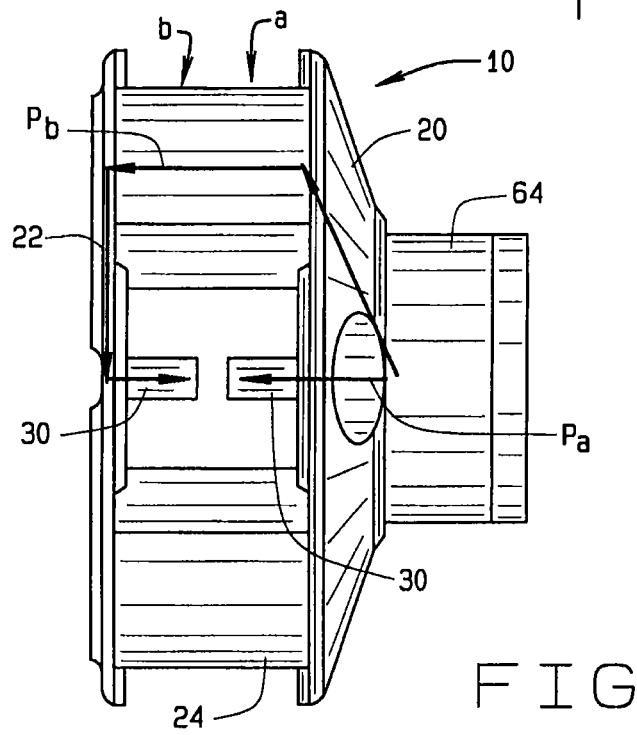
Figure 8:
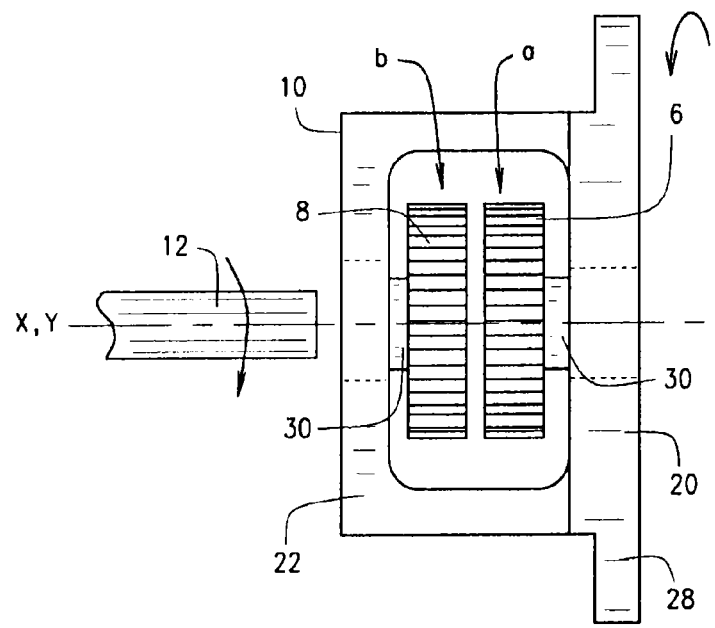
Figure 8B:
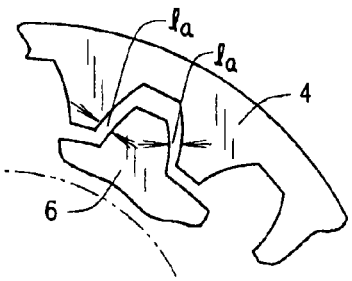
Figure 8A:
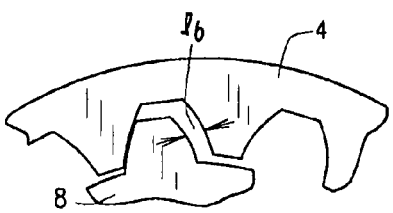
Figure 9:
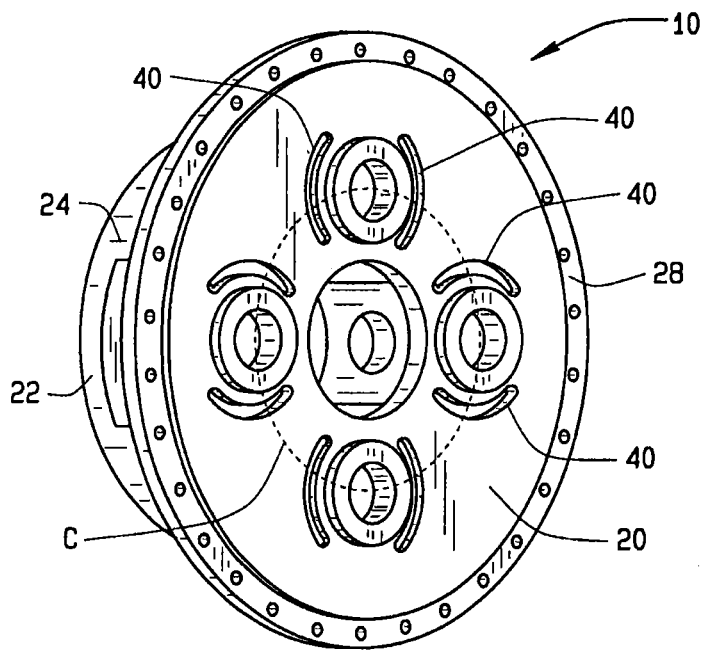
Figure 10:
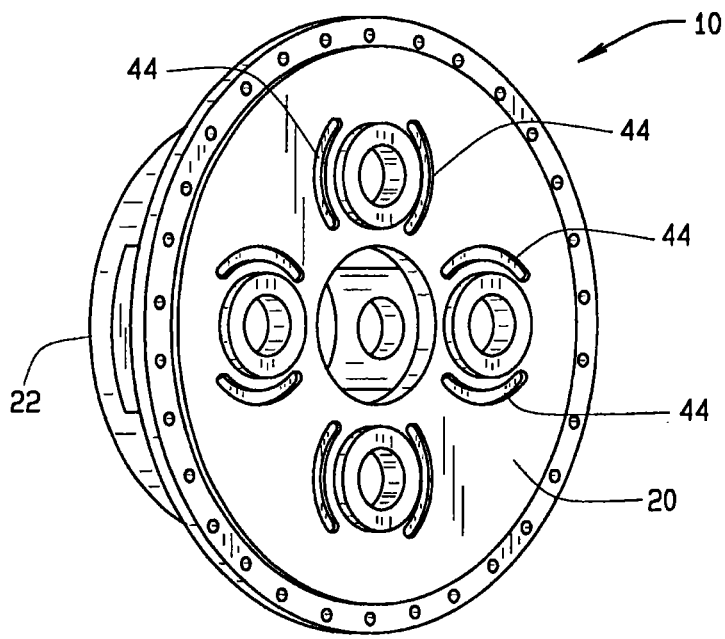
Figure 11:
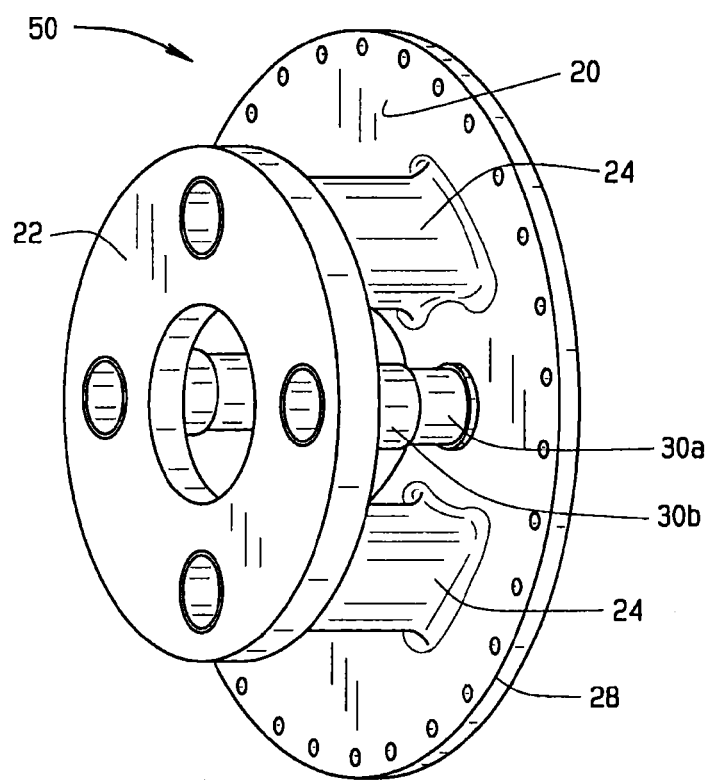
Figure 12:
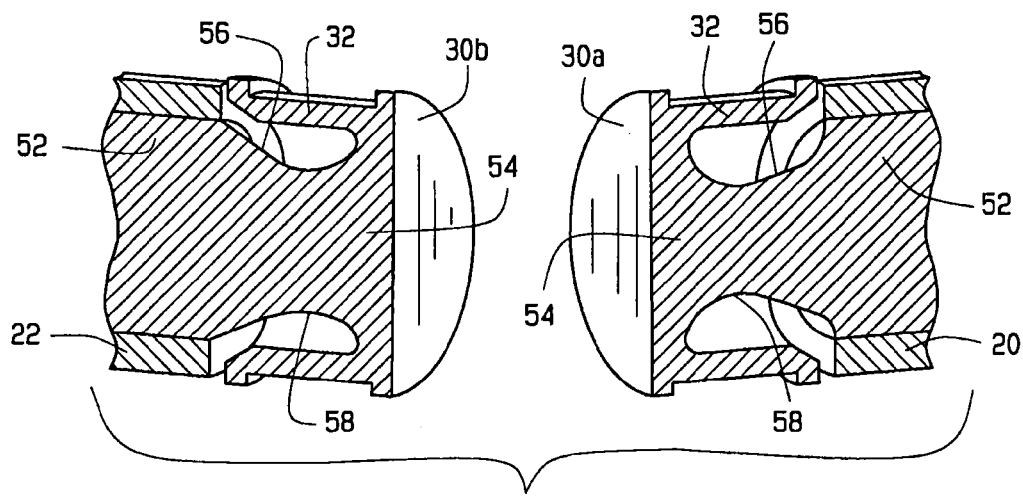

FIGS. 6, 6A, and 6B are schematic views showing an angular offset between the flexpins of the two arrays to compensate for the distortion of the carrier and the resulting planet pinion and ring gear mesh;

FIG. 7 is a perspective view of the carrier and also showing the angular offset;

FIGS. 8, 8A, and 8B are schematic views showing narrower teeth for the pinions of one of the arrays to compensate for the distortion of the carrier; and FIG. 9 is a perspective view of a carrier provided with areas of weakness in its primary wall to impart equivalent deflective characteristics to the flexpins of its two arrays;

FIG. 10 is a perspective view of an alternative carrier with areas of weakness in its primary wall;

FIG. 11 is a perspective view of a carrier that has the flexpins of differing flexibility to impart equivalent deflective characteristics;

FIG. 12 is a longitudinal sectional view of the flexpins for the alternative carrier of FIG. 11; and FIG. 13 is an elevational view of the carrier having a hub for transferring torque to it.

BEST MODES FOR CARRYING OUT THE INVENTION

Figure 1:
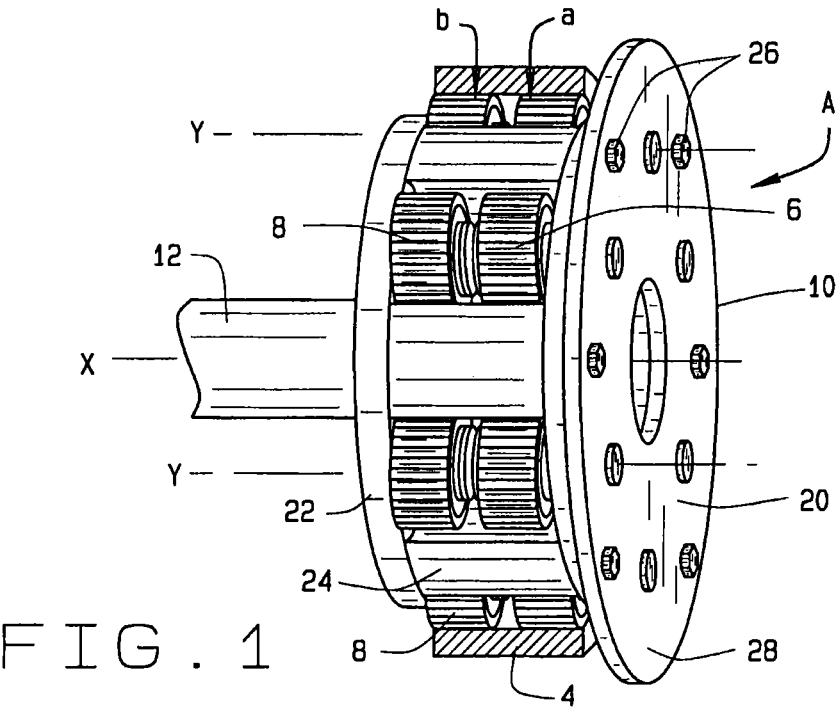
FIG. 1 is a perspective view, partially broken away and in section, of an epicyclic gear system having its planet pinions arranged in two arrays on flexpins and otherwise being constructed in accordance with and embodying the present invention.
Figure 2:
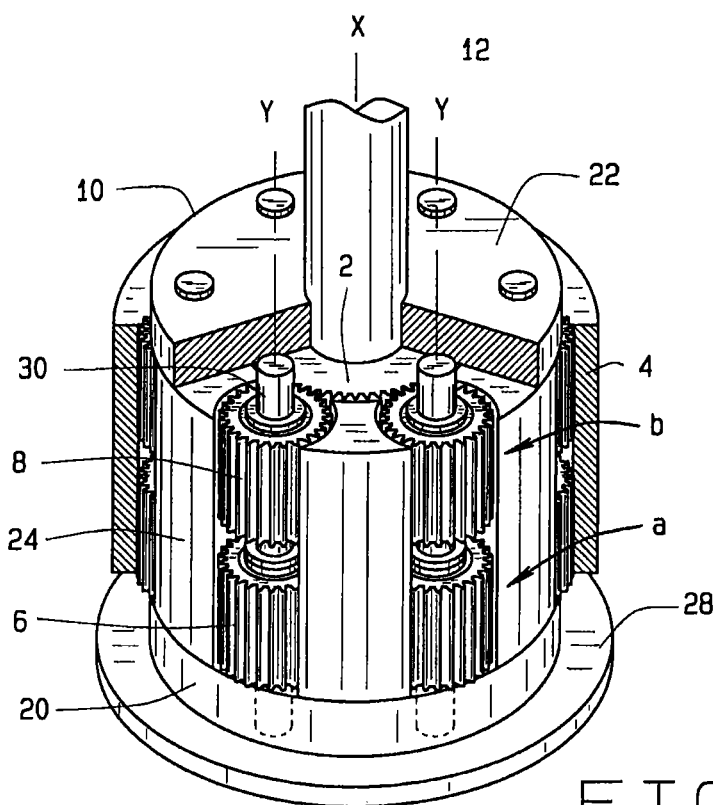
FIG. 2 is another perspective view of the gear system, again partially broken away and in section.

Referring now to the drawings, an epicyclic gear system A (FIGS. 1 & 2) that is organized about a central axis X includes a sun gear 2, a ring gear 4 that surrounds the sun gear 2 and shares the axis X with the sun gear 2, and planet pinions 6 and 8 that are arranged in two rows or arrays a and b between the sun and ring gears 2 and 4. The planet pinions 6 and 8 of the two arrays a and b mesh with both the sun and ring gears 2 and 4, but rotate about axes Y that are offset from, yet parallel to, the central axis X. In addition, the gear system A has a carrier 10 that supports the planet pinions 6 and 8 and establishes the offset axes Y about which they rotate. The sun gear 2, ring gear 4, and carrier 10 represent components, any two of which may rotate while the third is typically held fast.

The epicyclic gear system A depicted is well suited for use in wind turbines that harness the wind and convert it into electrical energy. However, it lends itself as well to other applications in which torque is applied at any one of the components and torque is delivered at either of the remaining two components, while the third component is held fast. In a wind turbine in which the epicyclic gear system A serves as the transmission for increasing the relatively low angular velocity of a wind-powered rotor to a higher velocity suitable for an electrical generator small enough to fit into the nacelle of the wind turbine, the wind-powered rotor is coupled to the carrier 10, the sun gear 2 is connected to a shaft 12 that is coupled through more gearing to the electrical generator, and the ring gear 5 remains fixed. The carrier 10 and sun gear 2 rotate in the same direction.

The carrier 10 has two walls between which the planet pinions 6 and 8 are confined—a primary wall 20 and a secondary wall 22—and also axially directed webs 24 that extend between the walls 20 and 22 and connect them rigidly together. The webs 24 create within the carrier 10 pockets that are occupied by the planet pinions 6 and 8, there being a pinion 6 and a pinion 8 in each pocket. To facilitate installation of the planet pinions 6 and 8 within the carrier 10, the webs 24 are formed integral with the secondary wall 22 and initially separate from the primary wall 20, only to be secured to the primary wall 20 with screws 26 during assembly. Likewise, the webs 24 may be formed integral with the primary wall 20 and separate from the secondary wall 22. The shaft 12 for the sun gear 2 extends through one or both of the carrier walls 20 and 22. The planet pinions 6 and 8 rotate within the pockets between the walls 20 and 22, yet project radially outwardly beyond the webs 24 for engagement with the sun gear 2 and ring gear 4. The primary wall 20 has a flange 28 that projects radially outwardly beyond the webs 24. The flange 28 serves as a location or coupling region at which torque is applied to the carrier 10.

Figure 3:
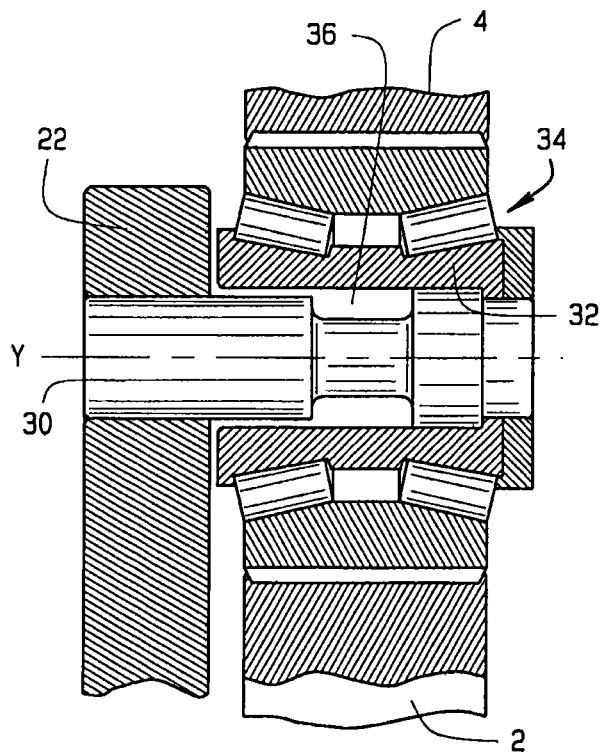
FIG. 3 is a partial sectional view showing one of the carrier walls and a flexpin on that wall.
Figure 4:
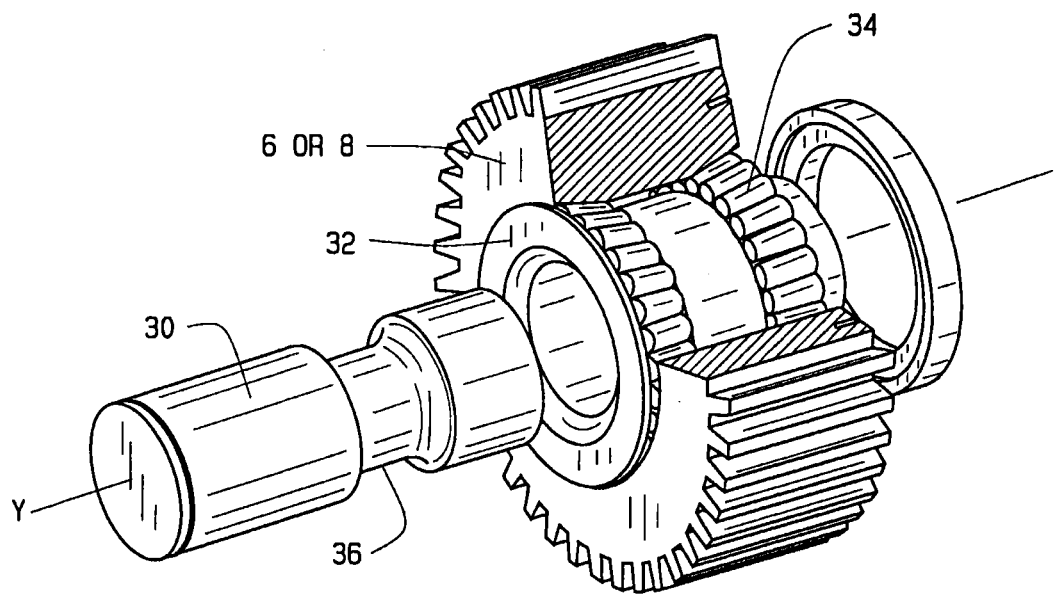
FIG. 4 is an exploded perspective view of a flexpin, its sleeve, bearing and planet pinion, for either one of the arrays.

The planet pinions 6 and 8 rotate about flexpins 30 and sleeves 32 (FIGS. 3 & 4), the former of which project from the carrier walls 20 and 22, there being a separate flexpin 30 and sleeve 32 for each planet pinion 6 and 8. Each flexpin 30 is anchored in or otherwise secured firmly to the wall 20 or 22 along which its planet pinion 6 or 8 is located such that it is cantilevered from the wall 20 or 22. The sleeve 32 encircles the flexpin 30, yet is spaced outwardly from the flexpin 30, except at the end of the flexpin 30 that is remote from the wall 20 or 22 from which it projects. Here the sleeve 32 is attached firmly to its flexpin 30 such that it is cantilevered from the flexpin 30, completing a double cantilever so to speak. Each planet pinion 6 or 8 encircles the sleeve 32 for its flexpin 30, there being a bearing 34 between the pinion 6 or 8 and the sleeve 32. The bearing 34 may take the form of an antifriction bearing in which the inner raceways are carried by the sleeve itself, or the sleeve may form part of a simple plain bearing. The flexpin 30 between the location at which it is cantilevered from its wall 20 or 22 and the location where its sleeve 32 is cantilevered from the pin 30 may have a groove 36 that imparts greater flexibility to the flexpin 30.

During the operation of the gear system A, with torque transferring through it, the flexpins 30 undergo flexures that offset their ends circumferentially with respect to the axis X. In other words, the remote end of each flexpin 30 lags slightly behind or advances slightly ahead of the end that are anchored in or to the carrier wall 20 and 22, reference being to the circumferential direction about the axis X. The sleeve 32, being cantilevered from the remote end of the pin 30, imparts a moment that causes the end of the pin 30 to flex in the opposite direction. Owing to this capacity of the pins 30 to flex, under two cantilevers, the sleeves 32 remain parallel to the central axis X, and, of course, the axes Y about which the planet pinions 6 and 8 rotate likewise remain parallel to the axis X.

Figure 5:
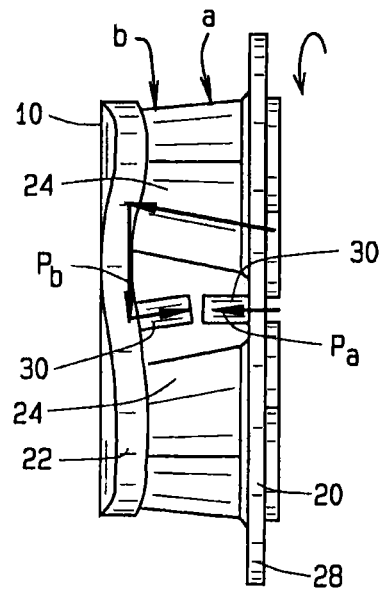
FIG. 5 is an elevational view of the carrier of the gear system, and showing load paths of uneven lengths and distortions, greatly exaggerated, caused by those uneven load paths.

When torque is applied to the carrier 10 at the flange 28 on its primary wall 20, that torque transfers between the flange 28 and to the pinions 6 of the array a in relatively short load paths $p_a$ (FIG. 5 that are basically confined to the primary wall 20 and the flexpins 30 on that wall 20. The torque also transfers between the flange 28 and the pinions 8 of the array b in significantly longer load paths $p_b$ that pass through the primary wall 20, the webs 24, the secondary wall 22, and the flexpins 30 on that wall 22. Were the carrier 10 a traditional carrier, the torque transferred through the shorter load paths $p_a$ may cause some distortion of the primary wall 20, but it is for all intents and purposes inconsequential. The torque transferred through the longer load paths $p_b$ would effect a much greater distortion in the more flexible secondary wall 22 and webs 24. This would render the array a having the shorter load path $p_a$ stiffer than the array b having the longer load paths $p_b$. With the axis X serving as a reference, the distortion would offset the flexpins 30 of the array b circumferentially with respect to the flexpins 30 of the array a. If under no load the pins 30 of the array a were to align with the pins 30 of the array b, once a load is applied to the carrier 10, thereby effecting a transfer of torque, the flexpins 30 of the array b will no longer align with the flexpins 30 in the array a. The planet pinions 6 of the array a and the planet pinions 8 of the array b would not mesh evenly with the sun gear 2 and ring gear 4. The uneven mesh would cause the planet pinions 6 of the array a to carry a greater load than the planet pinions 8 of the array b when the torque transferred through the system A reaches the torque at which the system A is designed to operate.

To compensate for the distortion of the carrier 10 and thereby overcome the deficiency, the carrier 10 is constructed such that when no torque is transmitted through it, the planet pinions 6 of the array a are indexed or offset circumferentially by an angle .theta. with respect to the planet pinions 8 of the array b (see arrows in FIG. 7). Thus, when the epicyclic gear system A is set in operation with a light torque applied at the carrier flange 28 and delivered through the shaft 12, the planet pinions 8 of the array b will engage first with the sun gear 2 and ring gear 4. As the torque increases, the carrier 10 undergoes distortions along its secondary wall 22 and at its webs 24 of the less stiff array b, and those distortions bring the planet pinions 8 of the array b closer to alignment with their counterpart pinions 6 in the array a. At the torque at which the system A is designed to operate, the flexpins 30 of the array b align with their counterparts in the array a and the planet pinions 6 and 8 mesh generally evenly with the sun gear 2 and ring gear 4. The planet pinions 6 and 8 of the two arrays a and b then share the transfer of torque generally evenly.

In any gear system, a backlash or clearance exists between the teeth where two gears mesh. In the system A, a clearance $l_b$ (FIG. 6A) exists where any planet pinion 8 engages the ring gear 4, that is to say, at the tooth on the planet pinion 8 that projects between a pair of successive teeth in the ring gear 4 and on the sun gear 2 as well. At no load or very light loads, the teeth of the planet pinions 6 in the array a do not actually engage the teeth of the ring gear 4 in the sense that the leading faces actually contact teeth of the ring gear 4, that is to say, a clearance exists on both sides of each meshed tooth. This derives from a smaller clearance $l_a$ (FIG. 6B) where the planet pinions 6 mesh with the ring gear 4, and that lesser clearance $l_a$ exists by reason of a slight angular offset $\theta$ of the flexpins 30 for the planet pinions 8 of the array b from the flexpins 30 of the array a, resulting in an offset clearance $l_\theta$. That offset clearance $l_\theta$ should conform to the following relationship:

$$l_b \geq l_b = l_\theta + l_a$$

As the torque applied at the carrier flange 28 increases, so does the clearance $l_a$ in the array a. When the torque reaches that at which the system A is designed to operate, the clearance $l_a$ in the array a and the clearance $l_b$ in the array b are substantially the same, and the planet pinions 6 and 8 mesh essentially evenly with the ring gear 4. Since the mesh is even, the planet pinions 6 and 8 share the torque evenly, that is to say, the magnitude of the torque transferred through the planet pinions 6 of the array a is substantially the same as the magnitude of the torque transferred through the pinions 8 of the array b. The conditions and compensation that exists at the mesh between the planet pinions 6 and 8 and the ring gear 4 also exist at the mesh between the planet pinions 6 and 8 and the sun gear 2.

While the screws 26 hold the carrier 10 together in that they pass through the primary wall 20 and thread into the webs 24 or otherwise clamp the webs 24 and the walls 20 and 22 together, they might not provide the precision required to establish the angle $\theta$ between the pins 30 of the array a and the pins 30 of the array b. The precision may be achieved with dowels 38 (FIG. 7) that fit tightly into the primary wall 20 and into the webs 23, assuming that the secondary walls 22 and the web 24 are formed integral.

In the alternative, the compensation for distortion of the carrier 10 may be provided by making the teeth of the planet gears 6 in the array a circumferentially narrower than the teeth of the planet gears 8 in the array b (FIG. 8B), resulting in a larger backlash for the planet pinions 6 than for the planet pinions 8. As a consequence, when no or little torque is transmitted, the teeth of the planet pinions 8 engage the sun and ring gears 2 and 4 in the sense that they actually contact the teeth of the sun and ring gears 2 and 4. But the planet pinions 6, while meshing with the sun and ring gears 2 and 4, do not actually engage those gears 2 and 4. In other words, the teeth of the planet gears 6, where they mesh with the sun and ring gears 2 and 4, do not actually contact the teeth on the sun and ring gears 2 and 4. Instead, they are narrow enough to fit between successive teeth on the sun and ring gears 2 and 4 with a clearance $l_a$ at each of the leading and trailing faces at the point of mesh. The clearance $l_a$ should conform generally to the following relationship:

$$l_b < 2l_a$$

As the torque increases, the secondary wall 22 and the web 24 of the more flexible array b flex enough to displace the flexpins 30 for the pinions 8 of the array b angularly with respect to the flexpins 30 for the pinions 6 of the array a. The narrower teeth of the pinions 6 actually engage the teeth of the sun and ring gears 2 and 4 in the sense that they contact the teeth of the sun and ring gears 2 and 4. At this juncture, torque transfers through the planet pinions 6 and 8 of both arrays a and b. When the torque transferred reaches the magnitude for which the system A is designed to operate, the flexure of the secondary wall 22 and webs 24 is such that the planet pinions 6 and the planet pinions 8 share the torque transfer essentially equally, that is to say, one-half transfers through the pinions 6 of the array a and the other half transfers through the pinions 8 of the array b. This alternative provides compensation irrespective of the direction in which the external torque is applied to the carrier 10.

In another alternative, compensation for the distortion along the secondary wall 22 and webs 24 is provided by rendering the primary wall 20 more flexible where the flexpins 30 for that wall 20 emerge from it. This, in effect, allows the flexpins 30 on the primary wall 20, when the gear system A transmits torque, to undergo about the same amount of deflection as the flexpins 30 on the secondary wall 22. To this end, the primary wall 20 at each flexpin 30 has an area of weakness in the form of a pair of arcuate cutouts or slots 40 (FIG. 9) of equal radius and length, with their centers being at the axes Y for the flexpin 30. The slots 40, which open out of both faces of the wall 20, are arranged 180° apart with their centers generally located along a circle C that circumscribes the axes Y of the several pins 30 and having its center at the central axis X. In other words, one slot 40 lies circumferentially ahead of the pin 30 and the other slot 40 lies circumferentially behind the pin 30. Thus, the slots 40 impart more flexibility to the primary wall 20 where the flexpins 30 extend from it than does the secondary wall 22 where the flexpins 30 emerge from it. This selective weakness approach gives the flexpins 30 of the primary wall 20 essentially the same deflective characteristics as the flexpins 30 on the secondary wall 22. This in turn renders the two arrays a and b equally stiff—or equally flexible—so that the pinions 6 of the array a and the pinions 8 of the array b mesh evenly with the sun gear 2 and ring gear 4 and the pinions 6 and 8 share the torque transferred essentially evenly.

The primary wall 20 may also be rendered more flexible at its flexpins 30 with arcuate grooves 44 (FIG. 10) that open out of only one face of the primary wall 20 instead of both faces as do the slots 40. Like the slots 40, the grooves 44 should leave the flexpins 30 of the primary wall 20 with essentially the same deflective characteristics as the flexpins 30 of the secondary wall 22, so that the pinions 6 and 8 of the arrays a and b share the torque generally evenly.

Neither the slots 40 nor the grooves 44 need to be arcuate in configuration, but they should render the primary wall 20 more flexible to the sides of the flexpins 30 along which they are located. Shapes other than slots or grooves will also suffice if they enable the flexpins 30 with which they are identified to deflect more easily in the circumferential direction, reference being to the central axis X. For example, the primary wall 20 may have a region of thinner cross section, not necessarily resembling an arc, at the side or sides of each flexpin 30. The shapes, whether they be the slots 40 or the grooves 44 or some other configuration, may reside only to one side of each flexpin 30 in the primary wall 20.

In lieu of compensating at the primary wall 20 for the variations in the lengths of the two load paths $p_a$ and $p_b$, the compensation may be at the flexpins 30 themselves. An alternative carrier 50 (FIGS. 11 & 12) has a primary wall 20 and a secondary wall 22, with webs 24 extending between the two walls 20 and 22. The primary wall 20 is devoid of any slots 40 or grooves 44 or other shapes designed to impart greater flexibility to the wall 20 itself. However, the pinions 6 of the array a rotate about flexpins 30a that differ from flexpins 30b about which the pinions 8 of the array b rotate. The difference resides in the flexibility of the pins 30a and 30b themselves; the pins 30a for the array a are more flexible than the pins 30b for the array b. To this end, each pin 30a and 30b has (FIG. 12) a base 52 where it is fitted into the wall 20 and 22 from which the pins 30a and 30b extends and a head 54 at the opposite end of the pins 30a and 30b. Between its base 52 and its head 54, each pin 30a and 30b has an intervening shank 56. The sleeve 32 that surrounds the pin 30a and 30b is fitted to its head 54 and may even be formed integral with the head 54. The shank 56 tapers downwardly from the base 52 and from the head 54 to a necked-in region 58. The diameter for the necked-in region 58 of each pin 30b that projects from the secondary wall 22 exceeds the diameter for the necked-in region 58 for each pin 30a that projects from the primary wall 20. This imparts greater flexibility to the pins 30a. The arrangement is such that the deflection of the pins 30b occasioned by the distortion of the secondary wall 22 and webs 32 under load equals the deflection of the more flexible pins 30a, so that the pinions 6 and 8 that are carried by the pins 30a and 30b, respectively, share the load evenly, that is to say their pinions 6 and 8 transfer essentially the same amount of torque.

The flexpins 30a may be rendered more flexible than the flexpins 30b without reducing the diameter of their necked-in regions 58. For example, the flexpins 30 may be hollow or partially hollow, while the flexpins 30b are solid throughout. Also, the flexpins 30a may be formed from a material that flexes more easily than the material from which the flexpins 30b are formed. Then again, a combination of the foregoing, including variance in diameters of the necked-in regions 58, may be employed. The object is to render the flexpins 30a more flexible than the flexpins 30b irrespective of the manner in which it is achieved.

In the carrier 10, the same effect may be achieved by making the grooves 36 in the flexpins 30 at the primary wall 20 deeper than the grooves 36 in the flexpins 30 at the secondary wall 22. Indeed, by so configuring the flexpins 30 of the primary wall 20, the arcuate slots 40 or grooves 44 may be eliminated or diminished in size.

The carrier 50 with flexpins 30a and 30b of different flexibility in its primary wall 20 may be provided with arcuate slots 40 or grooves 44 or other shapes to impart greater flexibility to the primary wall 20 at its flexpins 30a. In that arrangement, the desired deflective characteristics for the flexpins 30a of the array a are derived from both the primary wall 20 and the greater flexibility of the flexpins 30a that project from the wall 20. This arrangement for balancing the deflection of the flexpins 30a and 30b represents a combination of the selected wall weakness approach and the variance-in-pin stiffness approach.

The external torque need not be applied to either carrier 10 or 50 through a flange at the periphery of its primary wall 20, but instead elsewhere on the wall 20, such as through a hub 64 (FIG. 13) that serves as a coupling region on the wall 20. Again the load path $p_b$ for the array b is longer than the load path $p_a$ for the array a. Similar distortions in the secondary wall 22 and webs 24 occur.

The invention claimed is:

1. An epicyclic gear system comprising:
a sun gear having an axis;
a ring gear surrounding the sun gear and having an axis that coincides with the axis of the sun gear;
first planet pinions meshing with the sun and ring gears in a first array;
second planet pinions meshing with the sun and ring gears in a second array that is offset axially from the first array;
a carrier having first flexpins coupled to the first planet pinions and second flexpins coupled to the second planet pinions, the carrier further having a coupling region at which torque is applied to the carrier when the gear system is subjected to a load, the torque transferring between the coupling region and the first flexpins through first load paths and between the coupling region and the second flexpins through second load paths that are longer than the first load paths, and with the difference in lengths of the load paths causing a distortion in the carrier; and,
means for compensating for the distortion to effectively adjust the stiffness of the carrier and enable the first and second pinions to mesh more evenly with the sun and ring gears when torque is applied to the carrier, said means for compensating including one of:
an angular offset of the first flexpins from the second flexpins in the absence of a torque being applied to the carrier;
having teeth on the first planet pinions be narrower than teeth on the second planet pinions;
forming areas of weakness in the carrier at the first flexpins; and,
having the first flexpins be more flexible than the second flexpins,
whereby any of the means for compensating results in the first flexpins and second flexpins undergoing substantially the same deflection when torque is applied to the carrier regardless of any carrier distortion caused by differences in the length of the load paths.

2. An epicyclic gear system according to claim 1 wherein the carrier has first and second walls and webs connecting the walls; and the first flexpins being cantilevered from the first wall and the second flexpins being cantilevered from the second wall.

3. An epicyclic gear system according to claim 2 wherein the means for compensating includes areas of weakness in the first wall where the first flexpins are cantilevered from the first wall.

4. An epicyclic gear system according to claim 3 wherein the areas of weakness are formed by slots or grooves in the first wall.

5. An epicyclic gear system according to claim 4 wherein the slots or grooves are arcuate and follow the contour of the first flexpins.

6. An epicyclic gear system according to claim 4 wherein the slots or grooves lie along a circle that circumscribes the axes of the first flexpins.

7. An epicyclic gear system comprising:
a sun gear having an axis;
a ring gear surrounding the sun gear and having an axis that coincides with the axis of the sun gear;
first planet pinions meshing with the sun and ring gears in a first array;
second planet pinions meshing with the sun and ring gears in a second array that is offset axially from the first array; and
a carrier including:
a first wall;
a second wall spaced axially from the first wall;
webs connecting the first and second walls;
first flexpins cantilevered from the first wall and projecting into the first pinions;
sleeves interposed between the first flexpins and the first pinions and being cantilevered from the ends of the first flexpins that are remote from the first wall;
second flexpins cantilevered from the second wall and projecting into the second pinions;
more sleeves interposed between the second flexpins and the second pinions and being cantilevered from the ends of the second flexpins that are remote from the second wall;
a coupling region at which the carrier is subjected to a torque when a load is transferred through the gear system, with that torque transferring to the first pinions through first load paths that pass through the first flexpins and transferring to the second pinions through second load paths that pass through the second flexpins, the second load paths being longer than the first load paths and causing a greater distortion of the carrier along the second load paths than along the first load paths when a load is transferred through the gear system; and means for compensating for the greater distortion along the second load paths than along the first load paths to effectively adjust the stiffness of the carrier and enable the first and second pinions to mesh more evenly with the sun and ring gears in spite of the distortion, said means for compensating including one of:

an angular offset of the first flexpins from the second flexpins in the absence of a torque being applied to the carrier;

having teeth on the first planet pinions be narrower than teeth on the second planet pinions;

forming areas of weakness in the carrier at the first flexpins; and, having the first flexpins be more flexible than the second flexpins, whereby any of the means for compensating results in the first flexpins and second flexpins undergoing substantially the same deflection when torque is applied to the carrier regardless of any carrier distortion caused by differences in the length of the load paths.

8. An epicyclic gear system according to claim 7 wherein the areas of weakness are formed by slots or grooves in the first wall adjacent the first flexpins.

9. An epicyclic gear system according to claim 8 wherein the slots or grooves are arcuate and follow the contour of the first pins.

10. An epicyclic gear system according to claim 8 wherein the slots or grooves lie along a circle that circumscribes the axes of the first flexpins.

11. An epicyclic gear system comprising:

a sun gear having an axis;

a ring gear surrounding the sun gear and having an axis that coincides with the axis of the sun gear;

first planet pinions meshing with the sun and ring gears in a first array; second planet pinions meshing with the sun and ring gears in a second array that is offset axially from the first array;

a carrier having first flexpins coupled to the first planet pinions and second flexpins coupled to the second planet pinions, the carrier further having a coupling region at which torque is applied to the carrier when the gear system is subjected to a load, with the torque transferring between the coupling region and the first flexpins through first load paths and between the coupling region and the second flexpins through second load paths, the first load paths being stiffer than the second load paths with the difference in the stiffness of the load paths causing a distortion in the carrier; and, means for compensating for the distortion to effectively adjust the stiffness of the carrier and enable the first and second pinions to mesh more evenly with the sun and ring gears when torque is applied to the carrier, said means for compensating including one of:

an angular offset of the first flexpins from the second flexpins in the absence of a torque being applied to the carrier;

having teeth on the first planet pinions be narrower than teeth on the second planet pinions;

forming areas of weakness in the carrier at the first flexpins; and, having the first flexpins be more flexible than the second flexpins, whereby any of the means for compensating results in the first flexpins and second flexpins undergoing substantially the same deflection when torque is applied to the carrier regardless of any carrier distortion caused by differences in the length of the load paths.

\* \* \* \* \*